July 19, 1955  F. S. KING ET AL  2,713,371
TUBELESS TIRE
Filed Nov. 4, 1950  3 Sheets-Sheet 1
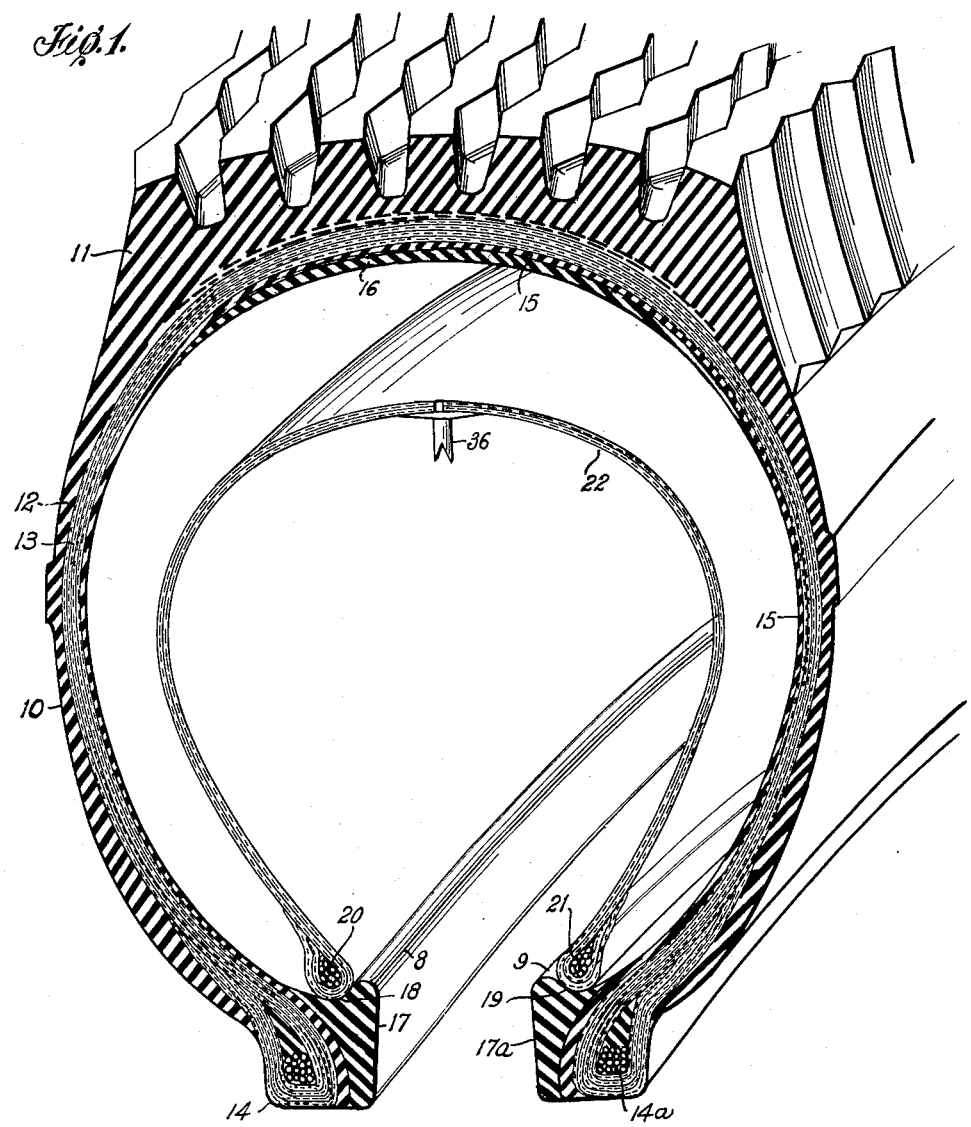
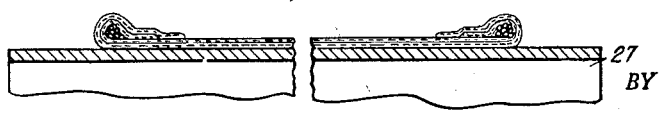
INVENTOR.
FRANK S. KING
AND
WILLIAM S. COBEN
BY
Ely & Frye
ATTORNEYS

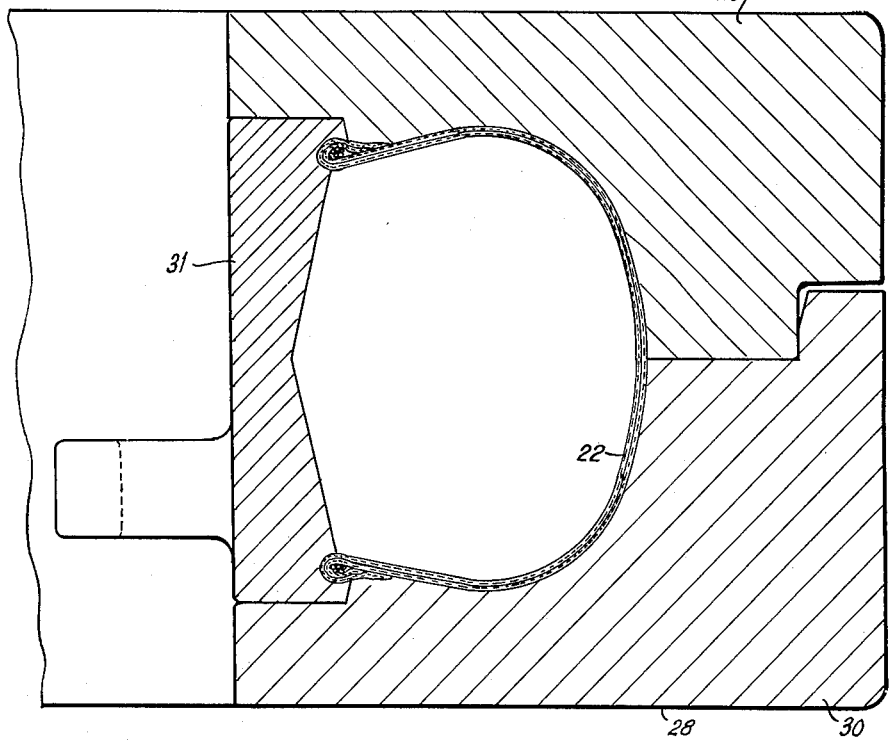
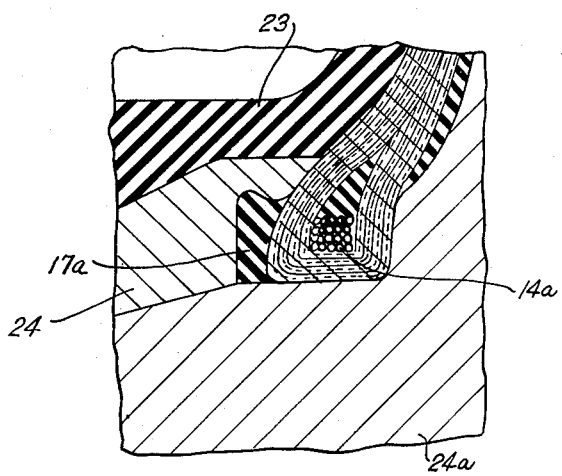
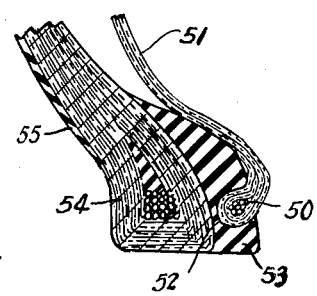
INVENTOR.
FRANK S. KING
AND
WILLIAM S. COBEN
BY Ely & Frye
ATTORNEYS July 19, 1955   F. S. KING ET AL   2,713,371
TUBELESS TIRE Filed Nov. 4, 1950   3 Sheets-Sheet 3

INVENTOR.
FRANK S. KING
AND
WILLIAM S. COBEN
BY
Ely & Frye
ATTORNEYS

United States Patent Office 2,713,371
Patented July 19, 1955

2,713,371

TUBELESS TIRE

Frank S. King and William S. Cohen, Akron, Ohio, assignors to The Firestone Tire & Rubber Company, Akron, Ohio, a corporation of Ohio Application November 4, 1950, Serial No. 194,129

15 Claims. (Cl. 152—341)

This invention relates to pneumatic tires of the tubeless type and has broadly as its object the provision of means for preventing the complete collapse of a tire in the event of a blowout or large puncture.

Heretofore, resort to various expedients has been had to provide a tubeless tire having sufficient merit to replace or compete with the conventional tire and tube combination now in common use. While tubeless tires have had some commercial acceptance, they have been particularly vulnerable to blowout or sudden collapse, with consequent danger to the occupants of the automobile. It is the object of the present invention to improve upon the construction and design of tubeless tires so as to make them blowout-safe.

In the tubeless tire of the present invention, practical and satisfactory means are provided to incorporate safety features in the tire which will allow the tire to deflate slowly in the case of a blowout or rupture of the tire, and thus enable the driver of the automobile to bring the car to a stop with danger of the car swerving or getting out of control.

The object of the invention is attained by providing a tire adapted for use upon a standard tire rim in which diaphragm seats are provided on the inner wall of the tire adjacent the beads thereof, said seats receiving inextensible marginal edges of a safety diaphragm mounted in the tire.

A further object of the invention is to provide a tubeless tire with a diaphragm adapted to be mounted therein, said diaphragm being so constructed and disposed relative to the tire as to function as a safety member, in the nature of a secondary or auxiliary load-carrying member which becomes operative, to carry the load on the tire, in the event of a tire blowout or sudden loss of inflation pressure.

Another object of the invention is to provide a diaphragm for use with an open-beaded tire, said diaphragm itself being open-beaded in shape and being composed principally of one or more plies of rubberized fabric attached at their edges to annular inextensible members, said diaphragm being adapted to be removably mounted upon seats formed on the inside bead portion of the tire.

A still further object of the invention is to provide a diaphragm of the type referred to above which may be easily mounted within a tire and which will automatically center itself relative to the tire and remain anchored in such position when the tire is run in service.

Another object of the invention is to provide a tubeless tire having internal diaphragm seats in combination with an inside coating of the tire which coating is more impervious to air than natural rubber.

Yet another object of the invention is to provide a tire having a diaphragm mounted therein adapted to function as an auxiliary load-carrying means, said tire having a coating substantially impervious to air so disposed as to prevent loss of inflation pressure so long as the coating is not ruptured, and to provide an additional coating or layer of material on the inside of the crown of the tire adapted to seal punctures.

Another object of the invention is to provide a safety element within a tubeless tire so disposed and anchored that it will not throw a tire out of balance by becoming misplaced in service.

These and other objects will be apparent from the following description, reference being had to the drawing in which:

Fig. 1 is a fragmentary perspective view of a tire embodying the present invention, before the tire is mounted upon its rim, showing the relative positions of the components of the combination thereof;

Fig. 2 is a longitudinal elevation broken away and partly in sectional view of a diaphragm building drum showing the first step in the manufacture of the diaphragm embodying the present invention;

Fig. 3 is a view similar to Fig. 2 showing the edges of the components of Fig. 1 folded back around the inextensible beads;

Fig. 4 shows the diaphragm of Fig. 3 laid in a mold as it will appear inflated during molding and vulcanization;

Fig. 7 is a fragmentary sectional view of the tire showing the relative positions of a curing bag, a bull ring, and a bead portion of said tire in the mold in which the tire is vulcanized; and Fig. 8 is a fragmentary sectional view showing the inextensible edge of a diaphragm and its seat in modified form.

Figure 6:
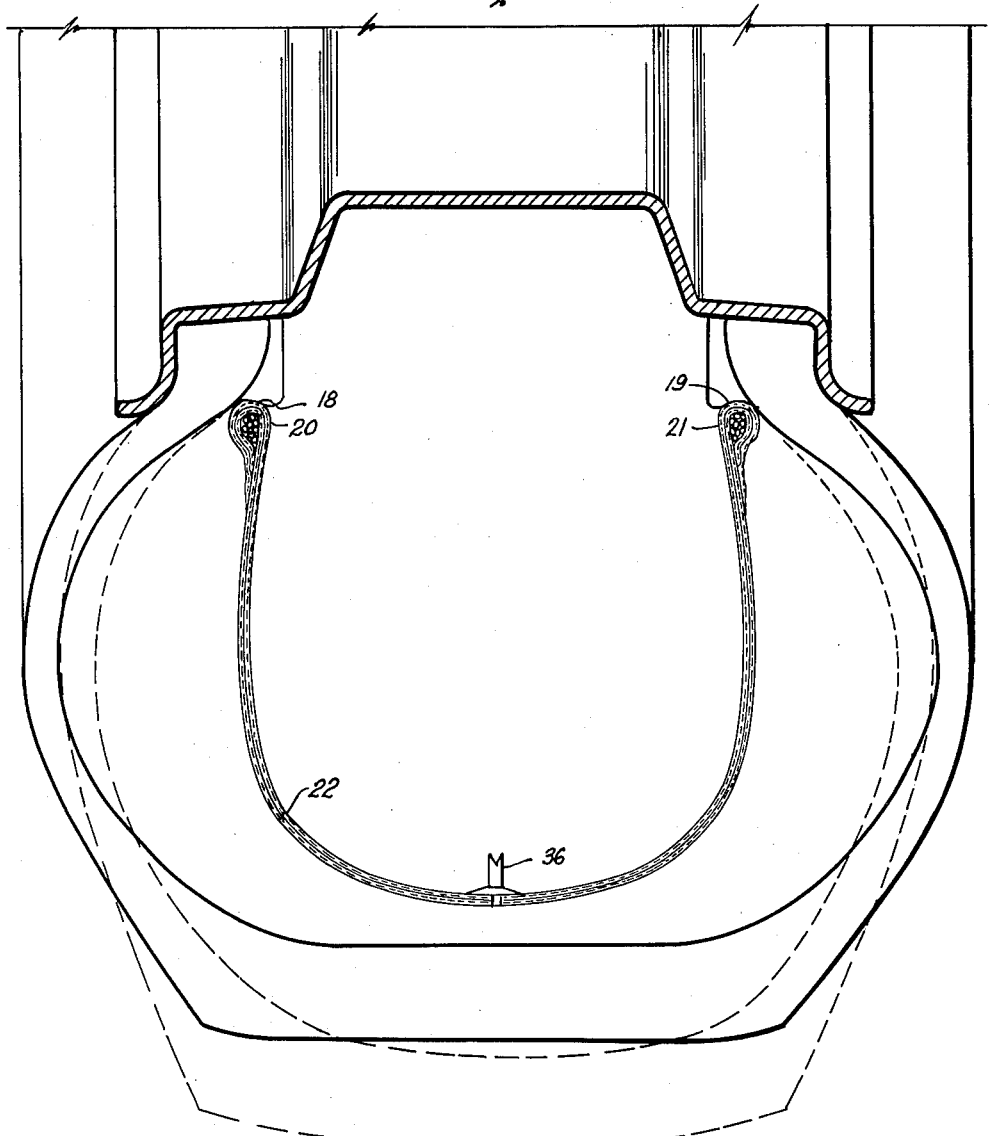
Fig. 6 is a sectional view of the tire shown in Fig. 1 mounted upon its rim and illustrating the relative positions of the diaphragm and the tire body in service.

Referring to Fig. 1 of the drawings, there is shown a tire 10 comprising the usual tread portion 11, sidewalls 12, tire plies 13 and bead portions 14. The beads are of the straight side type in which are located the usual reinforcing wires, indicated at 14a by which the tire is held on its seat on the rim. The present tire has an inside lining about the entire inner chamber. This lining is indicated by the numeral 15. It is impervious to air and preferably composed of Butyl of approximately .010" thickness. Also, a thick layer 16 having tapered edges is disposed at and attached to the inside of the crown of the tire. For passenger tires the layer 16 is preferably approximately 5/16" thick at its thickest portion and of a width to underlie the tread portion of the tire and is composed of rubber compounded so as to function as a puncture sealant. Such rubber compounds are well known, having been used quite generally in puncture sealing tubes. Diaphragm seats are molded in ledges 17 and 17a, said ledges being integral parts of tire 10 disposed at each bead portion thereof. The diaphragm ledges are preferably composed of flexible rubber and may be reinforced if found desirable. The latter inner portions of ledges 17 and 17a terminate in rounded circumferentially extending edges 8 and 9; the surfaces of these edges merge inwardly and laterally outwardly into grooves 18 and 19, adapted to receive and seat the inextensible edge portions 20 and 21 respectively of diaphragm 22. The inner lower edges of the diaphragm seats also assist in sealing the spaces between the rim and the beads, and thus prevent the escape of air from the inner chamber at those points.

Tire 10 may be built in any usual manner as, for example, upon a shoulder tire-building drum. It is to be understood that the inside lining 16 may be applied to the inside ply of the tire as a calendered coat or as a separate layer. If found desirable, the Butyl lining 15 may be given special treatment or compounding to improve its adherence to the wall of the tire of the wall of the tire may be treated to improve such adherence, or both the wall of the tire and the Butyl stock may be treated for such purpose. The ledges 17 and 17a are preferably extruded in strip form to substantially their molded shape and applied to the bead of the tire after the tire is removed from its building drum and before the tire is molded. The Butyl coating or lining 15, or other special lining adapted to prevent seepage of air therethrough, may, if desired, terminate at the radially outer edges of the ledges. Said ledges are sufficiently thick to prevent any appreciable permeation of air therethrough and in some cases a better union may be obtained by direct contact of the rubber ledges with the tire rather than with lining 15, although either arrangement may be used.

Referring now to Fig. 7 there is shown a portion of a curing bag 23 and a bull ring 24 and mold 24a, which are used to provide the molding pressure to the tire at the bead portion thereof and to accurately mold ledge 17a to the exact predetermined contour desired. The use of a curing bag and a bull ring to mold a tire at its bead is a well-known practice in the tire manufacturing industry and, for that reason, it is considered unnecessary to describe this process of molding said ledges 17 and 17a in detail.

Figure 5:
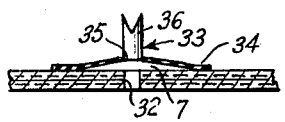
Fig. 5 is an enlarged detail sectional view of a portion of the diaphragm shown in Fig. 4 after it is removed from the mold and after a valve has been attached to the wall of the diaphragm.

The diaphragm 22, as will be seen by reference to Figs. 2 and 3, comprises two layers of rubberized cord fabric 25 and 26 and inextensible members 20 and 21. The plies 25 and 26 may consist of rubberized tire cord fabric but preferably consist of a strong, light rayon cord fabric embedded in a thin sheet of rubber with the cords of the two plies crossing at an angle of approximately 45°. In constructing the diaphragm, ply 25 is first laid on and around a flat type building drum 27 and spliced in the usual manner of drum building. It is to be understood that a shoulder type building drum may be substituted for drum 27 if found desirable. Next, ply 26, somewhat narrower than ply 25, is centered upon ply 25, thus providing stepped-off edges between the plies. Members 20 and 21, in the form of endless annular rings of tire bead wire, are passed over the edges of said plies and set a predetermined distance from said edges, after which the edges of the plies are turned back over said inextensible or bead members and stitched firmly down against the surface of ply 26 in the usual manner of turning tire plies about the inextensible beads of automobile tires. The next step is to remove diaphragm 22 from the building drum and place it in a curing mold 28, said mold comprising sections 29 and 30 and a base member 31 having registering recesses therein which together constitute a mold cavity conforming to the shape of the exterior contour of the diaphragm to be molded. In the present case the diaphragm is inflated in mold 28 with the curing medium in the form of air, steam or other fluids in direct contact with the inside surface of the diaphragm, all of which will be readily understood by those familiar with the art. It is to be understood, however, that if found desirable, a curing bag may be inserted in the diaphragm and the curing bag inflated to press the diaphragm against the mold wall in the manner of vulcanizing tires on curing bags. After molding and vulcanization, the diaphragm is removed from its mold and a hole 32 is punched through its wall and a molded rubber valve 33 having a base 7 is attached to the inside surface of the diaphragm, at the diaphragm's crown portion, as will be explained hereinafter and as will be seen by reference to Figs. 1 and 5. Valve 33 is a flutter valve type and functions in the same way as valve 17 to H. K. Chandley Patent No. 2,514,183, issued July 4, 1950, to which reference is made for a detailed description of the valve, the way it functions and its purpose. A valve of this type will permit free passage of air to the outer chamber of the tire during inflation, but will be closed, except for a small bleeder passage, when the air from the inner chamber of the tire seeks to flow into the outer chamber, when a blowout occurs. A rubber disc 34, having a central hole 35 punched therethrough, is placed over a stem 36 of valve 33, as shown in Fig. 5. Valve base 7, the disc 34, and the surface of the diaphragm in contact with these members are buffed and cemented with a self-curing cement after which the stem 33 is applied to the diaphragm with the passage through the valve aligned with hole 32, after which the disc 34 is applied thereby permanently attaching said valve to the diaphragm.

In mounting the diaphragm 22 in the tire body of the assembly 10, the diaphragm is first inserted within the tire casing in the same fashion as an inner tube is placed in regular tires. After the diaphragm has been so inserted, it will be seen that the edges 20 and 21 of the diaphragm lie adjacent to but not in the grooves 18 and 19. These inextensible edges 20 and 21 are next placed in grooves 18 and 19, respectively, by the simple expedient of manually forcing the inextensible members over the rounded circumferentially extending edges 8 and 9 by pressing the latter edges radially inwardly at one portion when the said inextensible members will snap into position. After the diaphragm has been mounted, as just described, the tire is mounted on its rim in the usual manner, it being understood that the rim may be a standard rim provided, however, with a valve opening communicating with the opening between the beads of the tire. Next, the tire is inflated in the usual manner and to the usual pressure. The flow of air into the tire during inflation is relatively slow and the opening in the flutter valve 33 is such that the air will pass therethrough as rapidly as it flows into the diaphragm and for this reason the flutter valve will not close during inflation. When the tire inflation is completed the air pressure inside and outside the diaphragm will be equal.

Referring now to Fig. 6, a diaphragm 22 is shown in the position it occupies when the tire is mounted on its rim, inflated and running at high speed in service. The outline of the tire shown in solid lines illustrates the position of the tire under normal load relative to the radially outward circumference of diaphragm 22. It will be noted that there is a substantial clearance between the diaphragm and the deflected tire, thereby avoiding chafing therebetween, which would injure one or both such members. It is an important feature of the invention that the width of diaphragm 22 is such that when subjected to centrifugal force in an inflated tire the diaphragm will be thrown radially outwardly a distance just short of contact with the inside of the crown of the tire at the latter's deflected portion when the tire is under normal tire load. It will also be noted by further reference to Fig. 6 that the inextensible edge portions 20 and 21 of the diaphragm have a contour complementary to the contour of the grooves 18 and 19, respectively, thereby providing a snug fit between said edges and the surface of said grooves. While some advantages of the invention result without the snug fit it has been found preferable and is pointed out that the inside diameters of the inextensible edges 20 and 21 are somewhat less than the outside diameter of the bottom of grooves 18 and 19, whereby a tight fit between the edges of the diaphragm and the bottom of said grooves is assured. It will now be seen that the members 17 and 17a are molded to predetermine dimensions and, due to the use of bull ring 24, the grooves 18 and 19 therein are molded with mechanical accuracy. In like manner, the edges 20 and 21 of the diaphragm are molded with mechanical accuracy so that when members 17, 17a and edges 20, 21, respectively, cooperate the diaphragm 22 is caused to occupy the exact predetermined position in the tire relative to the walls thereof. A common practice in the tire manufacturing industry is to provide balanced tires and the present invention contemplates the production of a balanced assembly of said tire proper including the ledges 17 and 17a. In like manner, diaphragm 22 is built in balance. Accordingly, it will also be seen that with the diaphragm removably anchored in position on ledges 17 and 17a an assembly in static and dynamic balance is provided. It will also be noted that the seats for the edges of the diaphragm are located in the immediate vicinity of the beads of the tire, where little or no action takes place during the running of the vehicle. This feature assists materially in maintaining the diaphragm in its seat in the interior of the tire. Were the seats for the edges of the diaphragm located further up in the side walls of the tire, the action of the tire in operation would tend to dislodge the diaphragm.

A modification of the diaphragm 22 and ledges 17 and 17a is illustrated in Fig. 8. In this modification, the marginal edges 50 of a diaphragm 51 seat in pockets or recesses 52 formed in ledges 53 attached to the bead portions 54 of a tire 55. The diaphragm and ledges shown in Fig. 8 differ from those previously described only in shape, it having been found that by molding the edges of the diaphragm in a laterally flared-out position and seating them in close fitting pockets 52 that the anchorage of the diaphragm and the sealing about the margins thereof is somewhat improved. Otherwise, the modifications shown in Fig. 8 is the same as that of Fig. 6 and functions in the same manner.

In operation and under the influence of centrifugal force, the diaphragm shown in Figs 1 or 8 will change its position somewhat and take the position illustrated in Fig. 6, but the diaphragm will not be displaced during running of the tire from its position concentric with the tire, because the ledges 18 hold the bead wires 20 from shifting in the tire. If, while in service and when the tire is being run on the road, the tire should blow out the air pressure within the diaphragm will be that of the original tire inflation pressure while the air pressure outside the diaphragm will be lost. This causes a rush of air through the flutter valve which causes the valve to close. Due to the compression fit of said inextensible edges of the diaphragm to their seats, there will be only a very slow, if any, leak of air about said edges of the diaphragm. Consequently, when the tire blows out or receives a large puncture, the diaphragm becomes an inflated member capable of supporting the load to which the assembly is subjected at a height less than the original height of the tire under load, but substantially higher than would be the case if an auxiliary load-carrying member were not present. It will be seen that the internal pressure within the diaphragm will keep the beads of the tire seated on the tire rim, thereby preventing the tire beads from working into the well of a drop center tire rim and the tire from being thrown from the rim.

Applicants' invention overcomes the faults of the prior art tubeless tires since, in the event of a blowout, there is provided auxiliary means to support the load at sufficient height to prevent any substantial loss of control of the steering of the car. The driver will recognize the softness of the tire and will be able to bring the car to a stop before all the inflation pressure leaks from the diaphragm.

Two embodiments of the invention have been described but it is to be understood that the present disclosures are to be considered from an illustrative standpoint and the invention is to be limited only by reference to the prior art.

What is claimed is:

1. A tubeless tire of the open-beaded type characterized by a removable diaphragm normally in contact therewith and therein, said diaphragm having inextensible edge portions and being of the general form of an open-beaded tire, and channel-shaped seats formed on and integral with the bead portions of the tire to receive the inextensible edge portions of the diaphragm.

2. A tubeless tire comprising a carcass having inextensible bead portions and a diaphragm having the general shape of an open-beaded tire, said bead portions having seats integral therewith formed on their lateral inner surfaces, said seats being adapted to receive the edge portions of a diaphragm mounted within said tire.

3. A two-piece open-headed pneumatic tire of the tubeless type comprising a casing and a removable safety diaphragm, said casing having bead portions formed with radially outwardly open ledges on the interior of the tire, said diaphragm being in the form of an open-bellied tire and having inextensible edge portions removably seated on said bead seats.

4. In combination a tubeless pneumatic tire, a diaphragm mounted therein, a tire and diaphragm receiving drop-center tire rim, laterally inwardly extending shoulders formed on the tire beads, said diaphragm having inextensible edge portions removably anchored on said shoulders, said diaphragm being adapted to form, relative to the air volume of the tire, a large inner air chamber of said tire and being concentric of said tire and rim, the diaphragm being so disposed relative to the tire that in service there is no contact between the diaphragm and the tire except at said bead shoulders.

5. In combination a tire casing of the tubeless tire type having beads therein, a diaphragm disposed within said casing, and a tire rim receiving said casing and diaphragm, said diaphragm having continuous circumferentially extending inextensible edge portions and being retained out of contact with the crown area of said casing, said casing having circumferentially extending diaphragm-edge-receiving seats in the form of radially outwardly opening grooves formed in ledges on the lateral inner surface of said beads, said ledges being fixedly attached to said casing and terminating radially outwardly of said beads at approximately the radially outward extremity thereof, the bottom of said grooves having a diameter at least as great as the inside diameter of said diaphragm edges.

6. In combination a pneumatic tire of the open-beaded type formed with an air-tight casing having bead portions therein, a removable diaphragm mounted within said casing and dividing the casing into inner and outer concentric annular air chambers, said diaphragm comprising a reinforced rubber body molded to the general shape of an open-beaded tire and having continuous inextensible edge portions, said tire having seating portions molded on the lateral inside portions of its beads adapted to seat said edges of the diaphragm, and a tire rim upon which said tire and diaphragm are mounted.

7. In a tire, diaphragm and rim assembly, an air retaining tire casing, a diaphragm disposed in said casing, and a tire and diaphragm receiving rim upon which the tire is mounted, said diaphragm being of the general shape of an open-beaded tire having two circumferentially extending inextensible edge portions, and a flexible body portion extending from said edge to edge, said diaphragm being disposed radially outwardly of the base of said rim and having a smaller cross-sectional circumference than the inner cross-sectional circumference of the tire casing for encompassing not less than fifty percent of the air contained in said assembly, means integral with said tire to maintain the diaphragm in concentric relation with respect to the tire during rotation of the tire at high speeds, said edges contacting the walls of the casing in substantially air-tight relation at the bead portions of the casing radially outward from said rim, said diaphragm being adapted to sustain the tire load upon rupture of the tire casing.

8. In a unit comprising a tire casing having beads therein, a diaphragm of the general shape of an open-beaded tire disposed within said casing, and a standard tire rim receiving said casing and diaphragm, said diaphragm having a body portion composed of at least one layer of reinforced rubber and having inextensible edges, said casing having circumferentially extending diaphragm-seating ledges located adjacent the bead portions of the tire and formed integral therewith, said ledges having radially facing grooves around their circumferential extent, said grooves being adapted to receive said inextensible edges of the diaphragm, the bottom of said grooves having a diameter greater than the inside diameter of the diaphragm edges.

9. In combination a tire casing having beads therein, a diaphragm disposed within said casing, and a standard tire rim receiving said casing and diaphragm, said diaphragm having continuous inextensible circumferentially extending edge portions and a crown portion, said crown portion being retained out of contact with said casing, said casing having circumferentially extending diaphragm-edge-receiving seats in the form of radially outwardly opening grooves formed in ledges disposed on the lateral inner surface of said beads, said ledges being an integral part of said casing and located at approximately the radially outward extremity of the beads, said edge portions being seated on said ledges.

10. A vehicle wheel comprising a tubeless pneumatic tire having bead portions, a tire supporting rim and a safety diaphragm in the form of an open-beaded tire including a body of rubber sheets reinforced with cord strain members, said diaphragm having edge portions removably seated at equal radial distances from the axis of said tire on ledges formed on the inside of said tire and integral therewith at the bead portions thereof, said diaphragm being disposed within said tire and having a common axis therewith, said tire and diaphragm having a common central radial plane normal to their axis.

11. A safety tubeless tire of the character described comprising a tire casing having diaphragm registering ledges molded on the lateral inside portions of each of the tire beads equi-distant from the axis of the tire and radially outward from the radial inside of said beads, a removable diaphragm adapted to carry the tire load in the event of a tire blowout, said diaphragm having inextensible edges seated on said ledges and extending radially outward in an arcuate path from one said ledge to the other, said diaphragm being disposed entirely within and normally spaced from the tire except at said ledges.

12. In combination an air retaining tire casing, a diaphragm within said casing dividing the latter into two compartments, and a tire rim receiving said casing and diaphragm, said casing having a layer of Butyl over substantially its entire inside surface, the inside surface of the casing between its shoulders having permanently attached thereto an additional layer of sealant composed of a viscous rubber compound, said casing having integral continuous circumferentially extending ledges molded on the lateral inside portions of the beads thereof, said ledges having radially outwardly facing circumferentially extending grooves formed therein, said diaphragm being of the general shape of an open-beaded tire and having a body portion comprising a plurality of layers of sheet rubber reinforced throughout their extent with cord fabric, said layers having each edge thereof folded about and anchored to an extensible annulus of wires, said grooves being adapted to receive and retain in removable relation the edges of the diaphragm, the diameter of the bottom of said grooves being not less than the inside diameter of said diaphragm edges, the body of said diaphragm being substantially impervious to air and having a flutter valve disposed in a hole in its wall through which valve air will slowly pass from the rim side of said combination but which valve will flutter shut upon a sudden rush of air from said rim side, said diaphragm having a sectional width relative to the extent of the inside surface of the tire radially outwardly of said ledges that the maximum distance said diaphragm will be thrown radially outwardly in service is insufficient to permit contact between the inside of the casing under its tread portion and the diaphragm when the casing is deflected under normal load, said diaphragm sectional width being sufficient to encompass a substantial portion of the air contained in said casing.

13. A tubeless tire of the open-beaded type, characterized by continuous circumferentially extending diaphragm-seating means for forming the laterally innermost faces of the tire beads, a diaphragm of the general shape of an open-beaded tire mounted in said tire, said diaphragm having radially inner circumferentially extending inextensible edges which have a common axis, said bead seats having an outside diameter of not less than the inside diameter of said diaphragm edges, said diaphragm edges and bead seats having a common axis, said edges being in removable air-tight contact with said seating means and a drop-center tire rim with said tire and diaphragm received thereon.

14. In a tire, diaphragm and rim assembly, an air retaining tire casing, a diaphragm disposed in said casing, and a tire and diaphragm receiving rim upon which the tire is mounted, said diaphragm being of the general shape of an open-beaded tire having two circumferentially extending inextensible edge portions, and a flexible body portion extending from said edge to edge, said diaphragm being disposed radially outwardly of the base of said rim and having a smaller cross-sectional circumference than the inner cross-sectional circumference of the tire casing for encompassing not less than fifty percent of the air contained in said assembly, means integral with said tire to maintain the diaphragm in concentric relation with respect to the tire during rotation of the tire at high speeds, said means comprising diaphragm edge-receiving seats in the form of radially outwardly opening grooves formed on the laterally inner surface of the beads of said tire, the latter inner edges of said grooves having an outside diameter greater than the diameter of the bottom of said groove, said grooves being adapted to receive and retain in removable relation said inextensible edge portions of the diaphragm, whereby the dynamic balance of the tire is not affected by the presence of the diaphragm.

15. A safety tubeless tire of the character described comprising a tire casing having laterally inwardly projecting diaphragm registering ledges molded on the lateral inside portions of each of the tire beads radially outward from the radial inside of said beads, a removable diaphragm adapted to carry the tire load in the event of a tire blowout, said diaphragm having inextensible edges seated on said ledges and extending radially outwardly in an arcuate path from one said ledge to the other, said diaphragm being disposed entirely within and normally spaced from the tire except at said ledges.

References Cited in the file of this patent

UNITED STATES PATENTS

| Number | Name | Date |
|---|---|---|
| 1,314,931 | Baker | Sept. 2, 1919 |
| 1,626,511 | Clark | Apr. 26, 1927 |
| 1,653,054 | Mack | Dec. 20, 1927 |
| 2,037,640 | MacMillan | Apr. 14, 1936 |
| 2,168,514 | Darrow | Aug. 8, 1939 |
| 2,200,916 | Crowley | May 14, 1940 |
| 2,224,066 | Shore | Dec. 3, 1940 |
| 2,308,955 | Wilson | Jan. 19, 1943 |
| 2,514,183 | Chandley | July 4, 1950 |
| 2,519,231 | Crawford et al. | July 4, 1950 |

FOREIGN PATENTS

| Number | Country | Date |
|---|---|---|
| 27,882 | Great Britain | 1896 |
| 291,503 | Great Britain | May 29, 1928 |